United States Patent [19]

Munkner et al.

[11] Patent Number: 5,311,980
[45] Date of Patent: May 17, 1994

[54] DEVICE AND METHOD FOR DISPLAYING ADVERTISEMENTS ON CONVEYORS

[75] Inventors: Jurgen R. Munkner; Heinz-Joachim E. Schroeder, both of Valencia, Spain

[73] Assignee: Tap (International Airport Promotion) N.V., Curaco, Netherlands

[21] Appl. No.: 57,804

[22] Filed: May 7, 1993

Related U.S. Application Data

[60] Division of Ser. No. 828,191, Jan. 30, 1992, Pat. No. 5,209,340, which is a continuation of Ser. No. 505,271, Apr. 6, 1990, abandoned.

[30] Foreign Application Priority Data

Jun. 2, 1989 [ES] Spain .................... 8901789

[51] Int. Cl.⁵ ............................................. B65G 43/00
[52] U.S. Cl. .................. 198/502.1; 198/577; 198/850; 40/472; 40/524
[58] Field of Search .................... 198/502.1, 577, 579, 198/803.16, 804, 822, 852, 853; 40/472, 476, 524, 526

[56] References Cited

U.S. PATENT DOCUMENTS 1,424,850  8/1922  Purcell ................. 198/852
1,812,715  6/1931  Quillin et al. .......... 40/472
1,817,373  8/1931  Hopkins ............... 198/852 X
3,410,390  11/1968 Petersen ................ 198/822
3,612,244  10/1971 Raub, Sr. et al. ....... 198/579
3,718,249  2/1973  Hess ................... 198/822
3,849,918  11/1974 Mazzocco, Sr. .......... 40/472
3,895,691  7/1975  Shiraishi .............. 198/852 X
3,982,625  9/1976  Wentz et al. .......... 198/577 X
4,979,591  12/1990 Habegger et al. ....... 198/502.1 X
5,165,526  11/1992 Conklin, Jr. ........... 198/804
5,209,340  5/1993  Munkner et al. ........ 198/502.1

Primary Examiner—Joseph E. Valenza
Assistant Examiner—Tuan N. Nguyen
Attorney, Agent, or Firm—Beveridge, DeGrandi, Weilacher & Young

[57] ABSTRACT

A method and apparatus is provided for displaying advertisements on item supporting conveyors such as conveyors which have belt-plates that overlap in curved areas and separate along straight portions of a conveyor track or which rotate in a common plane. A plurality of poster or advertisement segments, which are each either formed after adhesion to the track or prior to adhesion to the track, are secured so as to extend across a series of plates of the conveyor. The poster segments are printed with an advertisement and arranged on the conveyor plates so as to come together or separate in a manner which allows for easy reading or visualization of the advertisement and to separate or come together at a different portion of the conveyor track so as to be in a puzzling or difficult to read or visualize arrangement. The puzzling/non-puzzling effect of the displaying apparatus helps capture the audience's attention.

20 Claims, 2 Drawing Sheets

DEVICE AND METHOD FOR DISPLAYING ADVERTISEMENTS ON CONVEYORS

This is a divisional of co-pending application Ser. No. 07/828,191 filed on Jan. 30, 1992, now U.S. Pat. No. 5,209,340, which is a continuation of application Ser. No. 07/505,271 filed Apr. 6, 1990, now abandoned.

FIELD OF THE INVENTION

The present invention is directed at a method and apparatus for displaying advertisements on conveyors such as a baggage conveyor.

SUMMARY

The protection requested in this patent application must be understood to encompass the essence of the following description. Although a best effort is made to explicitly describe the cases, forms and variations to which the basic invention can be applied, it is unavoidable to narrow down its description to a few practical examples in order to make it intelligible. Therefore, the descriptions, drawings, explanations, and examples contained herein are to be taken only as a means to convey the essence of the basic invention, and any modifications derived therefrom must be included in the requested protection.

In its most general terms, an object of the present patent application can be described as the providing of properly prepared posters displaying advertising messages which are set in place over the belt-plates forming the belt of a conveyor. It is particularly applicable for use with any baggage conveyor used at airports.

Precedents on inventions and patents for publicity devices and advertising media, as well as their great importance in the modern world, are common knowledge. The value of these devices and media increases with their capability to attract attention to selected audiences.

This device creates a new and unexploited advertising medium with a unique character. It is strategically located at the meeting point of a mass of air travellers with expending means, avid of local information, and captive around the conveyor while waiting for the baggage arrivals. Further, it is entertaining, both in the form presented and in its imaginative possibilities, transforming an ordinary conveyor into a lively focus of attention.

The advertising posters are the main focal point of this device. They are made out of thin but strong materials, such as sheets of polyethylene or similar synthetics. They are sized and shaped according to the desired advertising messages or designs, within the area limits provided by the belt of a particular conveyor. The advertising messages or publicity designs displayed by the posters are printed in indelible, scratch-free printing inks. The posters are set in place, wrinkle-free, by means of pressure-sensitive adhesives or similar adhesive emulsions. Thus, each poster includes a contacting surface which is fixed with respect to the contacting surface of the underlying conveyor plate or plates such that the contacting surface of the plates and poster are essentially co-planar. Then, by means of a cutting process, the posters are adapted to each type of conveyor, as described below. When required, the posters also have small access perforations aligned with maintenance fasteners sometimes located on the belt-plates underneath.

In its overall conception, the materials, sizes and shapes, printing, adhesion, settings, cutting process, and perforations, are all selected and designed to assure that the posters: (a) properly meet their advertising displaying objective on a predetermined conveyor type; (b) set and stay firmly in place, yet are easily removed and replaced; (c) never interfere with the operation and maintenance of conveyors; and (d) endure the wearing and tearing of baggages and other objects transported on conveyors.

BRIEF DESCRIPTION OF THE DRAWINGS

In the following lines it is described the specific adaptation to any type of conveyor under any possible condition. In order to assist the description, two pages of drawings containing seven figures are attached to this application and made part thereof, as examples of the essence of the invention.

DETAILED DESCRIPTION OF THE PREFERRED EMBODIMENTS

Case (A): Elongated conveyors with non-overlapping belt-plates on which posters are set in place over several belt-plates. By being elongated (as opposed to circular), these conveyors have straight tracks and curved tracks.

Figure 1:
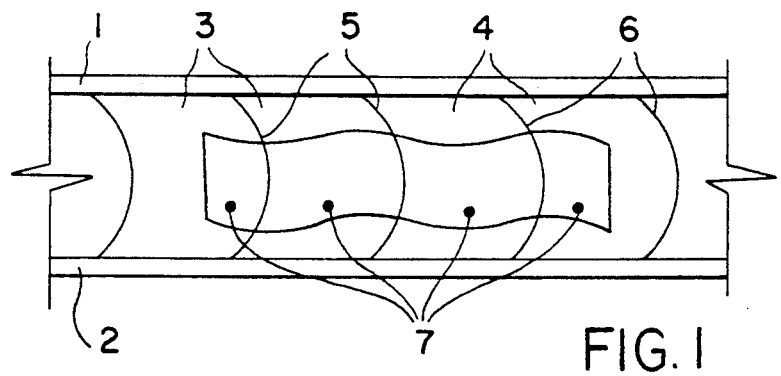
FIG. 1 illustrates a planar, partially broken away view of a first embodiment of the invention travelling along a straight section of a conveyor.

FIG. 1 represents a partial view of a straight track, showing: The rails (1, 2) between which the belt-plates (3, 4) run in their transport motion; the contours (5, 6 - arched in this example) of the belt-plates; and one advertising poster (7) set in place over several belt-plates (3, 4). During the transport motion through straight tracks, all belt-plates keep the same relative position to each other. As a result, all posters (7) are fully readable and composed as originally intended through the straight tracks.

Figure 2:
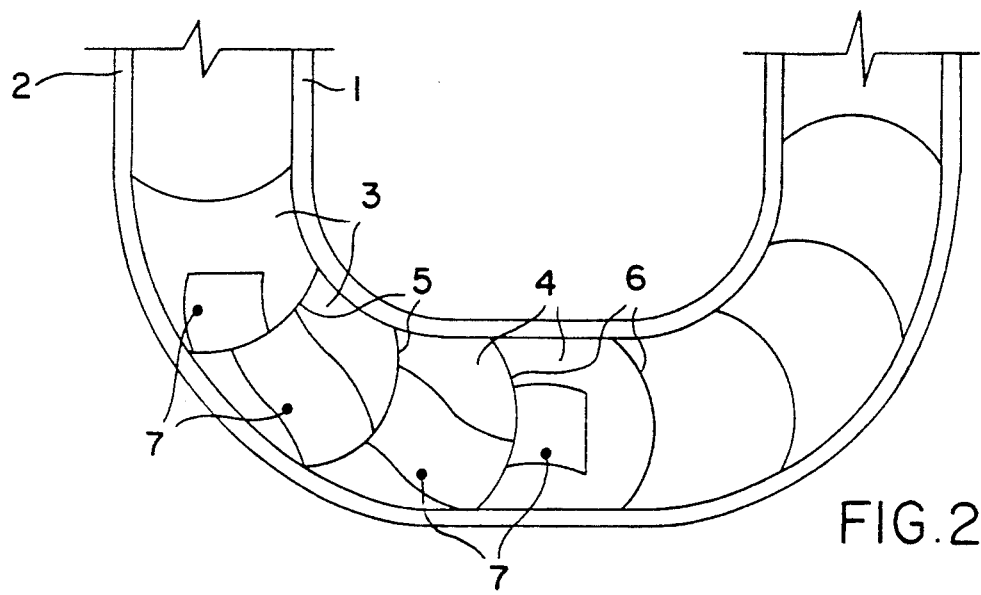
FIG. 2 illustrates a planar view of the embodiment of FIG. 1 travelling about a curved section of the conveyor.

FIG. 2 represents a view of a curved track of the same elongated conveyor represented in FIG. 1, showing: The rails (1, 2); the same belt-plates (3, 4) turning through a curved track; their contours (5, 6); and the same poster (7). During the transport motion through curved tracks, each belt-plate rotates on itself, changing the relative position to each other.

Figure 3:
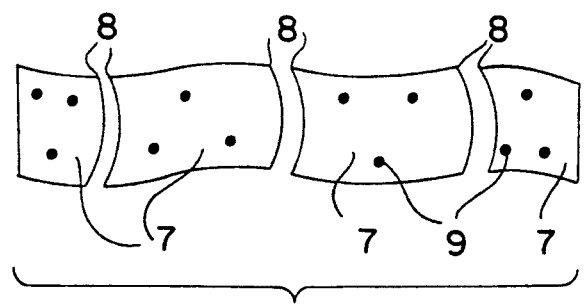
FIG. 3 shows a planar view of the poster segments of the first embodiment shown in FIG. 1.

For this reason, each poster (7) set in place over several belt-plates (3, 4) is cut along each belt-plate contour (5, 6) in order to allow for the free rotation play of the belt-plates in their transport motion through curved tracks. This cutting process leaves each poster unit divided in a number of portions (four in this example) which correspond to the same number of belt-plates underneath, as shown in FIG. 3. Since there is a small but definite gap between each adjacent belt-plate, two cuts per gap are made (8) and the poster material between cuts is then removed to prevent any interference with the free rotation play of each belt-plate.

Thus, after the cutting process described above, each portion of the poster set in place over its corresponding belt-plate also rotates on itself, changing the relative position to each other, as shown in FIG. 2.

As a result, all poster units (7) which were fully readable and composed as originally intended through straight tracks, now breakdown as puzzles through curved tracks (as shown in FIG. 2), only to recompose themselves and become fully readable again through the next straight track (as shown in FIG. 1).

This puzzle effect can also be accomplished, of course, in reverse. In this case, the posters are set in place at curved tracks as fully readable and composed units to which the cutting process is applied, and then these poster units breakdown as puzzles through straight tracks. The puzzle effect occurs in all elongated conveyors.

FIG. 3 represents a poster unit, as mentioned above. It also shows the small perforations (9) sometimes required to provide access to maintenance fasteners on the belt-plates underneath.

As described and shown above, the device, by means of the cutting process, fully meets its advertising displaying objective both through the conveyor's straight and curved tracks. The adaptations to any other type of conveyor are simple modifications or variations, which are part of this patent application, to the basic device as described for case (A).

Case (B): Elongated conveyors with non-overlapping belt-plates on which each poster is set in place over a single belt-plate. This case is identical to case (A) except that each poster is confined to a single belt-plate.

Thus, in this case, posters are simply set in place without applying any cutting process, since they never interfere with the free rotation play of any belt-plate in its transport motion through curved tracks.

Case (C): Elongated conveyors with overlapping belt-plates on which posters are set in place over either one or several belt-plates.

The belt-plates in these conveyors partially overlap each other on their transport motion through curved tracks. The overlapping area is always equal and well defined on all belt-plates, and only covers up to a maximum of one-half of their total area, leaving at least another one-half area never overlapped on each belt-plate.

Thus, in this case, posers are designed to display advertisement only on the corresponding areas of the belt-plates which never overlap. They are set in place, and then their blank, unprinted portions are cutoff and removed to prevent any interference with the overlapping action.

Figure 4:
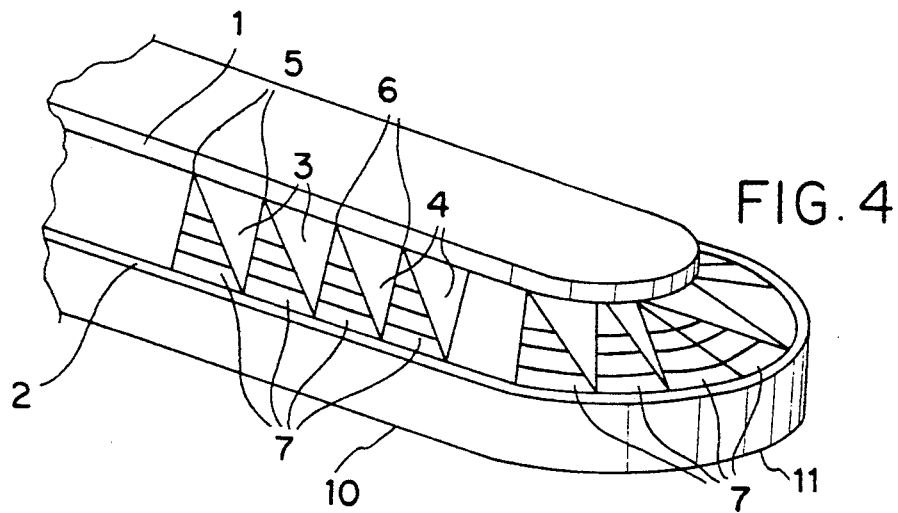
FIG. 4 shows a perspective view of a second embodiment of the invention.

FIG. 4 represents a partial view of a typical elongated conveyor with overlapping belt-plates, showing: The rails (1, 2); the straight track (10); the curved track (11); the belt-plates (3, 4 - rectangular in this example); the belt-plate contours (5, 6 - straight in this example); the overlapping areas of the belt-plates (3, 4); and two posters (7) with their blank portions removed, as they run through straight and curved tracks.

Figure 5:
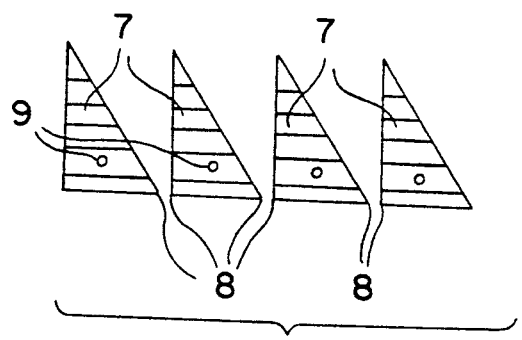
FIG. 5 shows the poster segments of the embodiment shown in FIG. 4.

FIG. 5 represents an example of a poster unit adapted to the elongated conveyor with overlapping belt-plates represented in FIG. 4, showing: The printed areas (7); the gaps (8); and the maintenance access perforations (9).

Case (D): Any circular conveyor on which posters are set in place over either one or several belt-plates. By being circular, the belt-plates in these conveyors always keep the same relative position to each other, never overlapping in their transport motion through the circular track.

Thus, in this case, posters are simply set in place without applying any cutting process.

Figure 6:
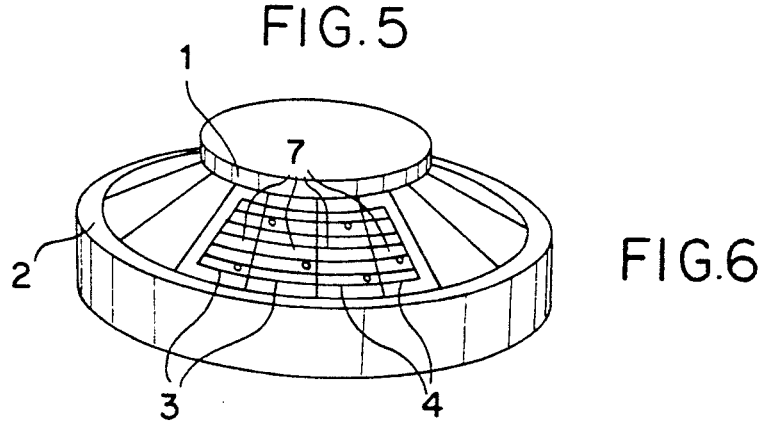
FIG. 6 shows a perspective view of a third embodiment of the present invention.

FIG. 6 represents a view of a typical circular conveyor, showing: The rails (1, 2); the belt-plates (3, 4); and a poster (7).

Figure 7:
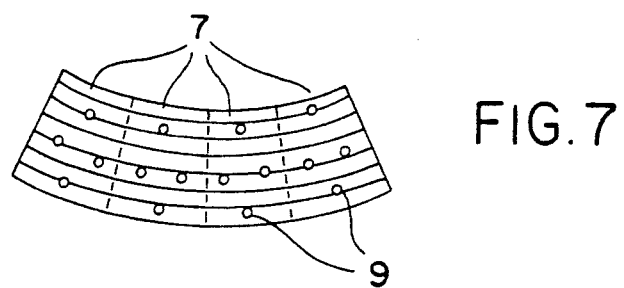
FIG. 7 shows the poster used in the third embodiment shown in FIG. 6.

FIG. 7 represents an example of a poster (7) adapted to the circular conveyor represented in FIG. 6, showing: Its possible truncated-cone shape to optimally conform the shape of this circular conveyor; the absence of any cuts or gaps, and the maintenance access perforations (9).

After completing above the description of the present invention, the points of protection are expressed in the following.

What is claimed is:

1. A device for the displaying of an advertisement message, said device comprising an item supporting conveyor, which conveyor includes a straight section and a curved section and a plurality of belt-plates that overlap during passage through the curved section, said device including an advertisement member with a message and means for securing said advertisement member to a series of adjacent item-supporting belt-plates, and said advertisement member including a plurality of advertisement segments each secured to a surface of a respective one of said belt-plates arranged in series, said advertisement segments being dimensioned and arranged so as to be viewable during passage of the series of belt-plates through the curved section, and said advertisement segments being arranged on said belt-plates so as to convey the message during travel of said series of advertisement segments through either said curved section or said straight section and to become disorientated so as to create a puzzle effect during the other of said curved section or said straight section.

2. A device as recited in claim 1 further comprising a first and second rail upon which said belt-plates are supported, and said first rail being positioned above and inward of said second rail such that said belt-plates are inclined.

3. A device as recited in claim 1 wherein said series of advertisement segments combine together in message conveying fashion through said curved section and separate apart in an essentially non-message conveying fashion during the straight section.

4. A device as recited in claim 1 wherein an upper surface of said belt-plates includes a planar item support surface which remains planar during travel of said belt-plates through the curved and straight sections, and said advertisement segments being poster segments that are secured to the item supporting surfaces and remain essentially coplanar with said belt-plates during travel of said belt-plates through the curved and straight sections.

5. A device as recited in claim 1 where the portion of each surface covered by said advertisement segments represents essentially all of an upper surface of the belt-plate which remains in a non-overlapping arrangement during travel of the belt-plates through the curved section.

6. A device as recited in claim 1 wherein said advertisement segments are triangular in shape.

7. A device as recited in claim 1 wherein each advertisement segment is viewable when the series of belt plates overlap in the curved section.

8. A device as recited in claim 1 wherein each advertisement segment covers only a section of an underlying belt plate which section is in a non-overlapping arrangement with an adjacent belt plate when the series of belt plates overlap in the curved section.

9. A device as recited in claim 1 wherein the puzzle effect includes disorientating said advertisement segments in an essentially non-message conveying fashion.

10. A device as recited in claim 1 wherein the item supporting conveyor is an airport baggage conveyor.

11. A method of displaying advertisement on an item supporting conveyor having a curved and straight-section, and a plurality of item supporting belt-plates which overlap during passage through the curved section comprising:

securing a plurality of advertisement segments to a series of said item supporting belt-plates such that each belt-plate in said series includes an advertisement segment; and said advertisement segments being secured to said series of belt-plates such that said segments convey a message when said belt-plates pass through either the curved section or said straight section, and said advertisement segments become disoriented so as to create a viewable puzzle effect during the other of said curved section or said straight section.

12. A method as recited in claim 11 wherein securing said advertisement segments to said series of belt-plates includes securing advertisement segments which cover essentially all of the upper surface of each of said belt-plates in said series which remains in a non-overlapping arrangement during travel of the belt-plates through the curved section.

13. A method as recited in claim 11 further comprising maintaining said advertisement segments in an essentially co-planar relationship with respect to the upper surface of said belt plates during travel of said belt plate through the curved section.

14. A method as recited in claim 11 wherein securing said advertisement segments to said belt-plates includes securing said advertisement segments such that the advertisement segments combine together in message conveying fashion during the curved section and separate apart in an essentially non-message conveying fashion during the straight section.

15. A method as recited in claim 11 wherein securing said advertisements segments includes affixing a poster comprised of said advertisement segments over a series of belt-plates in an overlapping arrangement and cutting said advertisement segments out of said poster while said poster is affixed to said series of belt-plates.

16. A method as recited in claim 11 wherein each advertisement segment is viewable when the series of belt plates overlap in the curved section.

17. A method as recited in claim 16 wherein each advertisement segment covers only a section of an underlying belt plate which section is in a non-overlapping arrangement with an adjacent belt plate when the series of belt plates overlap in the curved section.

18. A method as recited in claim 17 wherein the puzzle effect includes disorientating said advertisement segments in an essentially non-message conveying fashion.

19. A method as recited in claim 11 wherein the puzzle effect includes disorientating said advertisement segments in an essentially non-message conveying fashion.

20. A method as recited in claim 11 wherein securing the plurality of advertisement segments includes securing advertisement segments to a series of belt plates of an airport baggage conveyor.

* * * * *